US012654050B2

(12) United States Patent
Rucker et al.

(10) Patent No.: US 12,654,050 B2
(45) Date of Patent: Jun. 16, 2026

(54) SYSTEMS AND METHODS OF POLYMERIC SPRINKLERS

(71) Applicant: Tyco Fire Products LP, Lansdale, PA (US)

(72) Inventors: William K. Rucker, Cranston, RI (US); Steven L. Shields, Lubbock, TX (US); Lyle J. Miller, Milford, CT (US); Daniel Cross, South Kingston, RI (US)

(73) Assignee: Tyco Fire Products LP, Cranston, RI (US)

( * ) Notice: Subject to any disclaimer, the term of this patent is extended or adjusted under 35 U.S.C. 154(b) by 493 days.

(21) Appl. No.: 17/797,688

(22) PCT Filed: Feb. 5, 2021

(86) PCT No.: PCT/IB2021/050965
§ 371 (c)(1),
(2) Date: Aug. 4, 2022

(87) PCT Pub. No.: WO2021/156823
PCT Pub. Date: Aug. 12, 2021

(65) Prior Publication Data
US 2023/0149756 A1 May 18, 2023

Related U.S. Application Data

(60) Provisional application No. 62/971,336, filed on Feb. 7, 2020.

(51) Int. Cl.
*A62C 37/10* (2006.01)
*A62C 31/00* (2006.01)
(Continued)

(52) U.S. Cl.
CPC ............ *A62C 37/10* (2013.01); *A62C 31/005* (2013.01); *A62C 31/02* (2013.01); *C08J 5/042* (2013.01);
(Continued)

(58) Field of Classification Search
CPC ....... A62C 37/10; A62C 31/005; A62C 31/02; C08J 5/042; C08J 5/043; C08J 2371/00;
(Continued)

(56) References Cited

U.S. PATENT DOCUMENTS 6,025,285 A * 2/2000 Vyakarnam .............. D04H 1/60
442/368
6,691,790 B1 * 2/2004 MacDonald, III ..... A62C 35/60
169/39

(Continued)

FOREIGN PATENT DOCUMENTS

DE 10 2015 219 209 A1 4/2017
WO WO-2016/033188 A1 3/2016

OTHER PUBLICATIONS

SyBridge Technologies, "What is Fiber Orientation and Why Does it Matter?" May 4, 2020, https://sybridge.com/fiber-orientation/ (Year: 2020).*

(Continued)

*Primary Examiner* — Chee-Chong Lee
(74) *Attorney, Agent, or Firm* — Foley & Lardner LLP

(57) ABSTRACT

A sprinkler includes a body including an internal passageway extending from an inlet to an orifice. The body can be made of a composite material, such as a polymeric material. The sprinkler can include a first frame arm extending from the body, a second frame arm extending from the body, and a connector member connecting the first frame arm with the second frame arm.

19 Claims, 5 Drawing Sheets

(51) Int. Cl.
*A62C 31/02* (2006.01)
*C08J 5/04* (2006.01)

(52) U.S. Cl.
CPC ........... *C08J 5/043* (2013.01); *C08J 2371/00* (2013.01); *C08J 2377/06* (2013.01); *C08J 2379/08* (2013.01); *C08J 2381/04* (2013.01)

(58) Field of Classification Search
CPC . C08J 2377/06; C08J 2379/08; C08J 2381/04
USPC .......................................................... 169/38
See application file for complete search history.

(56) References Cited

U.S. PATENT DOCUMENTS

| | | | | | |
|---|---|---|---|---|---|
| 6,889,774 | B2 * | 5/2005 | Multer | .................... | B05B 1/262 |
| | | | | | 169/37 |
| 6,920,937 | B2 * | 7/2005 | Neill | .................... | A62C 31/005 |
| | | | | | 239/223 |
| 7,331,399 | B2 * | 2/2008 | Multer | ................... | A62C 37/12 |
| | | | | | 169/37 |
| 7,841,418 | B2 * | 11/2010 | Pahila | .................... | A62C 31/02 |
| | | | | | 239/223 |
| 7,854,269 | B2 * | 12/2010 | Franson | ................. | B05B 1/267 |
| | | | | | 169/41 |
| 8,136,744 | B2 | 3/2012 | Gerard et al. | | |
| 9,849,319 | B2 | 12/2017 | Ringer | | |
| 9,849,320 | B2 | 12/2017 | Ringer | | |
| 10,010,730 | B2 | 7/2018 | Abels et al. | | |
| 10,179,255 | B2 | 1/2019 | Almeida et al. | | |
| 10,426,984 | B2 | 10/2019 | Pipe et al. | | |
| 2011/0200816 | A1 | 8/2011 | Mizrahi et al. | | |
| 2018/0304109 | A1 | 10/2018 | Schnell et al. | | |
| 2021/0308699 | A1 * | 10/2021 | Drake | ................... | A62C 31/02 |

OTHER PUBLICATIONS

ASTM-D3418-21 (Year: 2021).*
ASTM-D570-22 (Year: 2022).*
ASTM-E831 (Year: 2024).*
Detailed_overview_of_ASTM. https://www.astm.org/about/overview/detailed-overview.html (Year: 2024).*
ASTM-D638-22 (Year: 2022).*
ISO Strategy and Mission. https://www.iso.org/strategy2030.html (Year: 2024).*
Korean Intellectual Property Office (KIPO); International Search Report and Written Opinion; PCT/IB2021/050965; dated Apr. 23, 2021; 12 pages.

* cited by examiner

100

112

108

104

SYSTEMS AND METHODS OF POLYMERIC SPRINKLERS

This application is the U.S. National Stage of International Patent Application PCT/IB2021/050965, filed Feb. 5, 2021 and titled "SYSTEMS AND METHODS OF POLYMERIC SPRINKLERS", which claims the benefit of and priority to U.S. Provisional Application No. 62/971,336, filed Feb. 7, 2020, and titled "SYSTEMS AND METHODS OF POLYMERIC SPRINKLERS", each the disclosure of which is incorporated herein by reference in its entirety.

BACKGROUND

Sprinklers can be used to respond to fires by providing fluids, such as water, to address the fire. For example, sprinklers can deliver fluid from a fluid supply when the sprinkler opens to address the fire.

SUMMARY

At least one aspect relates to a sprinkler. The sprinkler includes a body including an internal passageway extending from an inlet to an orifice. The body can be made of a composite material, such as a polymeric material. The sprinkler can include a first frame arm extending from the body, a second frame arm extending from the body, and a connector member connecting the first frame arm with the second frame arm.

At least one aspect relates to a sprinkler system. The sprinkler system includes one or more pipes that receive fluid from a fluid supply, a body, a first frame arm extending from the body, a second frame arm extending from the body, and a connector member connecting the first frame arm with the second frame arm. The body includes an internal passageway extending from an inlet coupled with the one or more pipes to an orifice. The body can be made of a composite material, such as a polymeric material.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure relates generally to the field of fire sprinklers. More particularly, the present disclosure relates to systems and methods of polymeric sprinklers.

Fire sprinklers can be made from metal materials, such as metal materials that have been validated to function under the rigors of fire conditions, including high temperatures. While polymeric sprinklers may allow for lower cost manufacturing, it can be difficult to manufacture polymeric sprinklers that can perform as needed under fire conditions, such as to maintain the shape of the sprinkler within appropriate tolerances so that resulting water flow and spray patterns output appropriately.

A sprinkler in accordance with the present disclosure can include a body, a first frame arm, a second frame arm, and a connector member. The body can include an internal passageway extending from an inlet to an orifice. The body can be made of a polymeric material. The first frame arm and the second frame arm can extend from the body. The connector member can connect the first frame arm with the second frame arm. The type of material used in the sprinkler (e.g., composite material), the direction of material flow to form the sprinkler, such as in an injection molding process, and the connector member, among other features of the sprinkler, can provide rigidity or strength to the sprinkler to enable the sprinkler to perform under fire conditions (including testing that represents fire conditions). The structure, material, and sizing of components of the sprinkler, including the connector member and the frame arms, can be made to mitigate regions identified during testing as having weak points, such as to space knit points of the fibers used in the injection molding process from locations subject to tensile or compressive forces.

Figure 1:
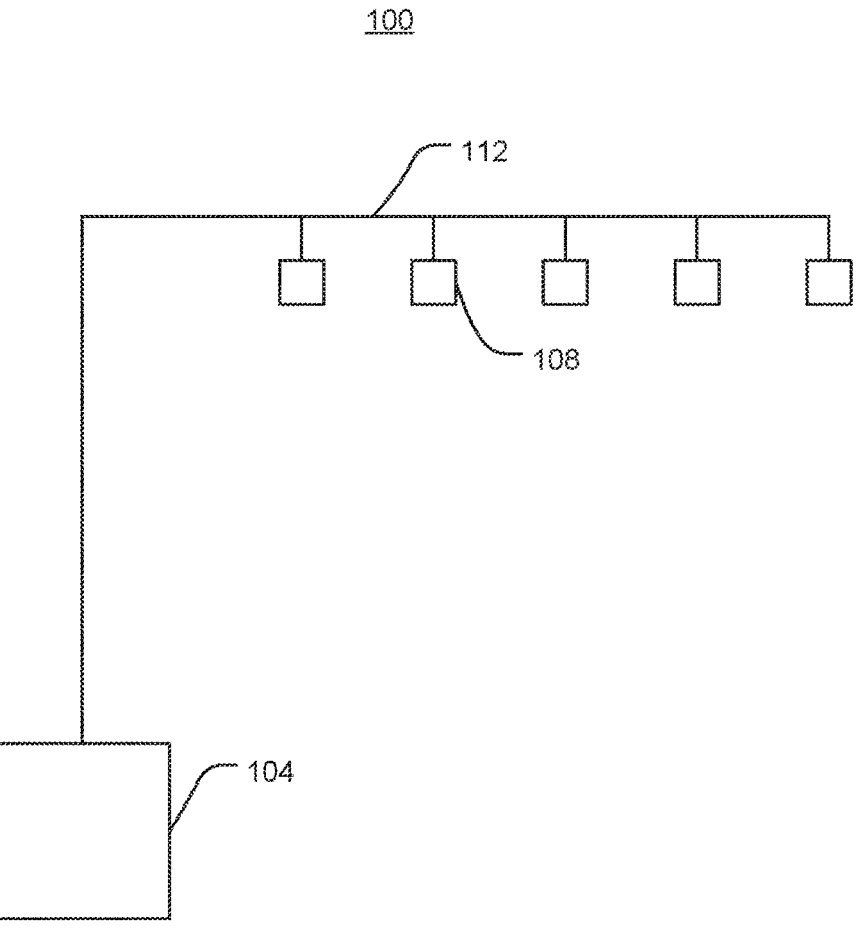
FIG. 1 is a block diagram of an example of a sprinkler system.

FIG. 1 depicts a sprinkler system 100. The sprinkler system 100 can include a fluid supply 104 coupled with one or more sprinklers 108 using one or more pipes 112. The sprinkler 108 can be actuated responsive to a fire condition, causing fluid to flow from the fluid supply 104 through the one or more pipes 112 and out of the sprinkler 108.

Figure 2:
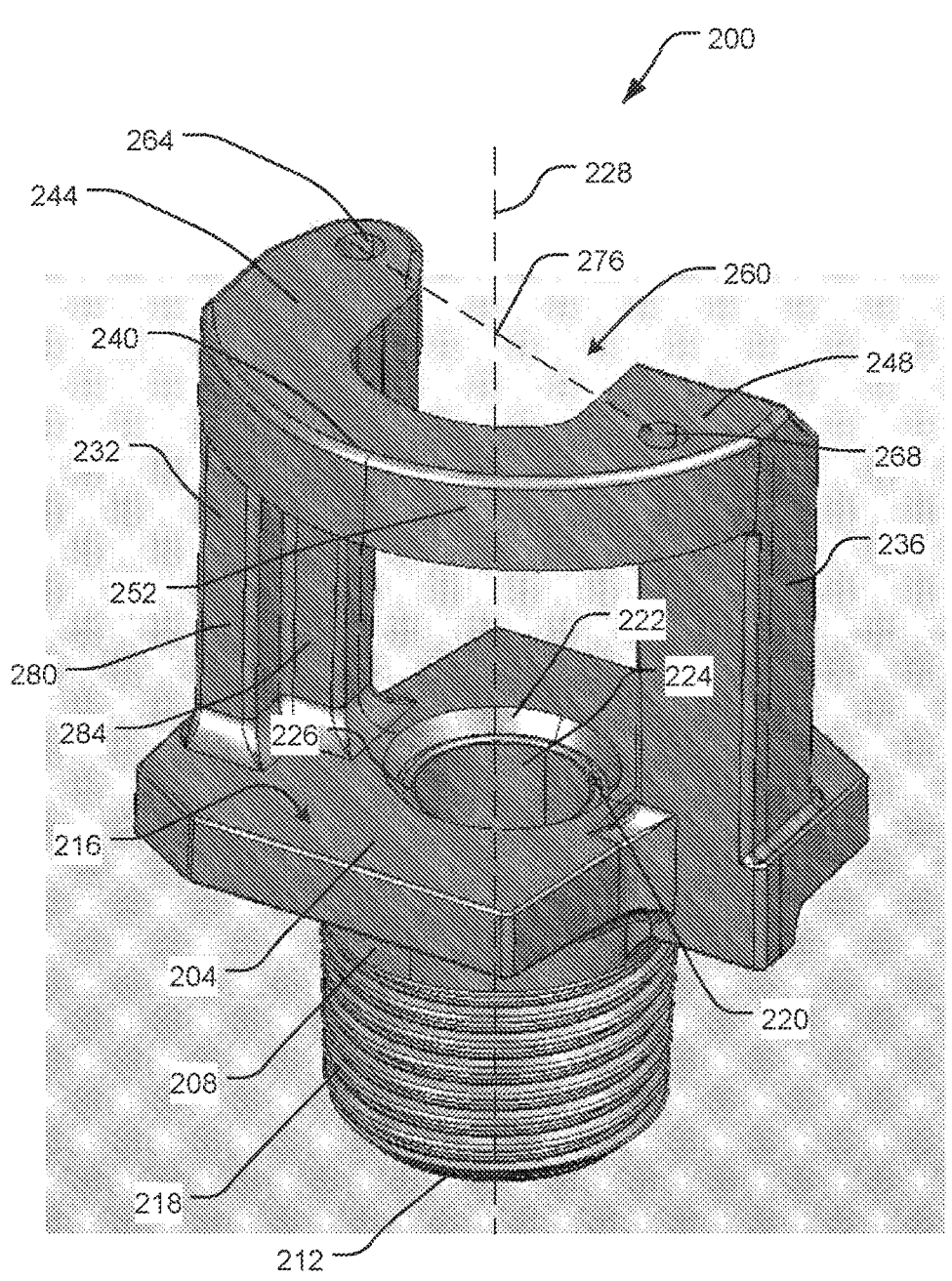
FIG. 2 is a perspective view of an example of a sprinkler.
Figure 3:
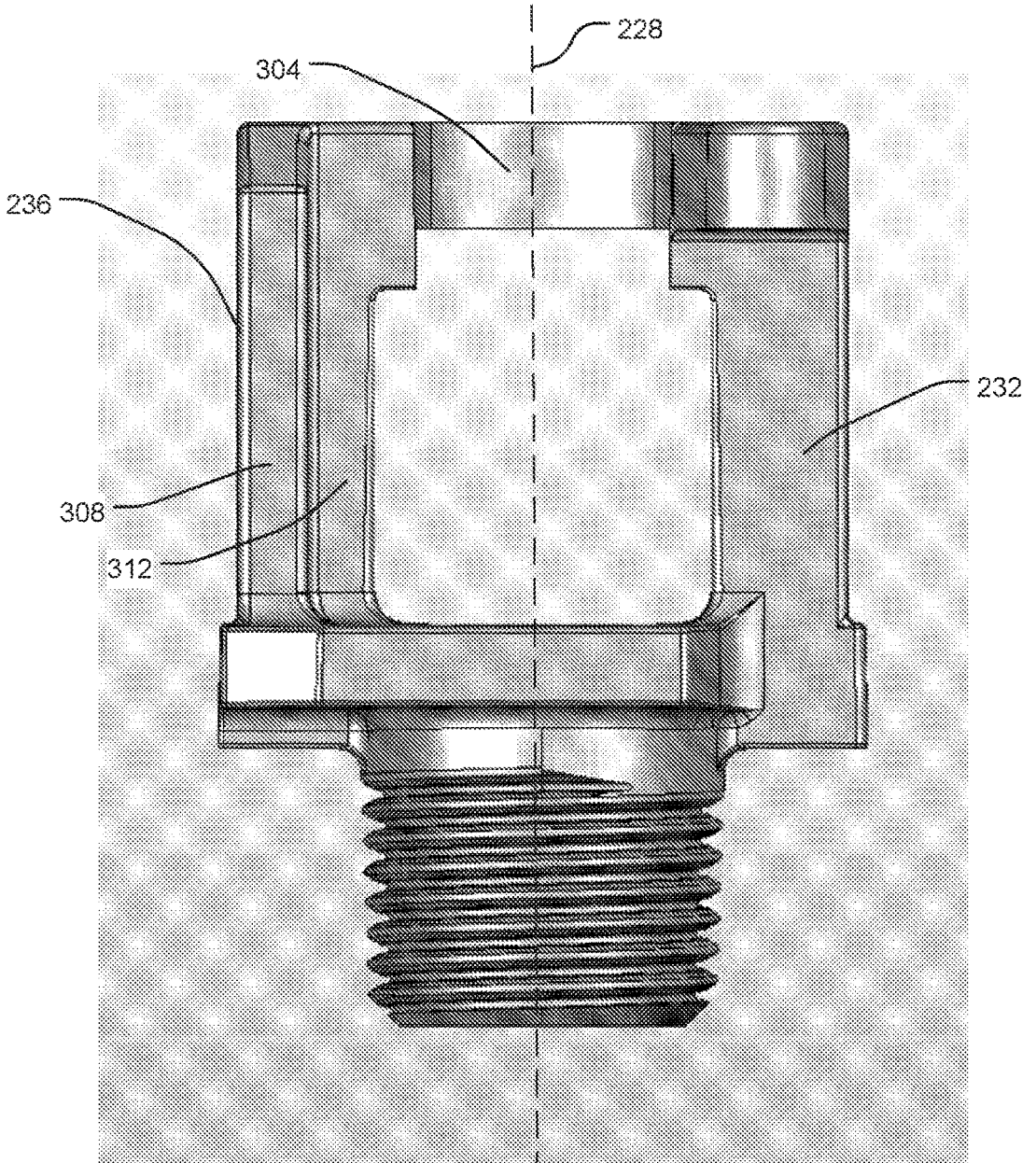
FIG. 3 is a side view of an example of a sprinkler.
Figure 4:
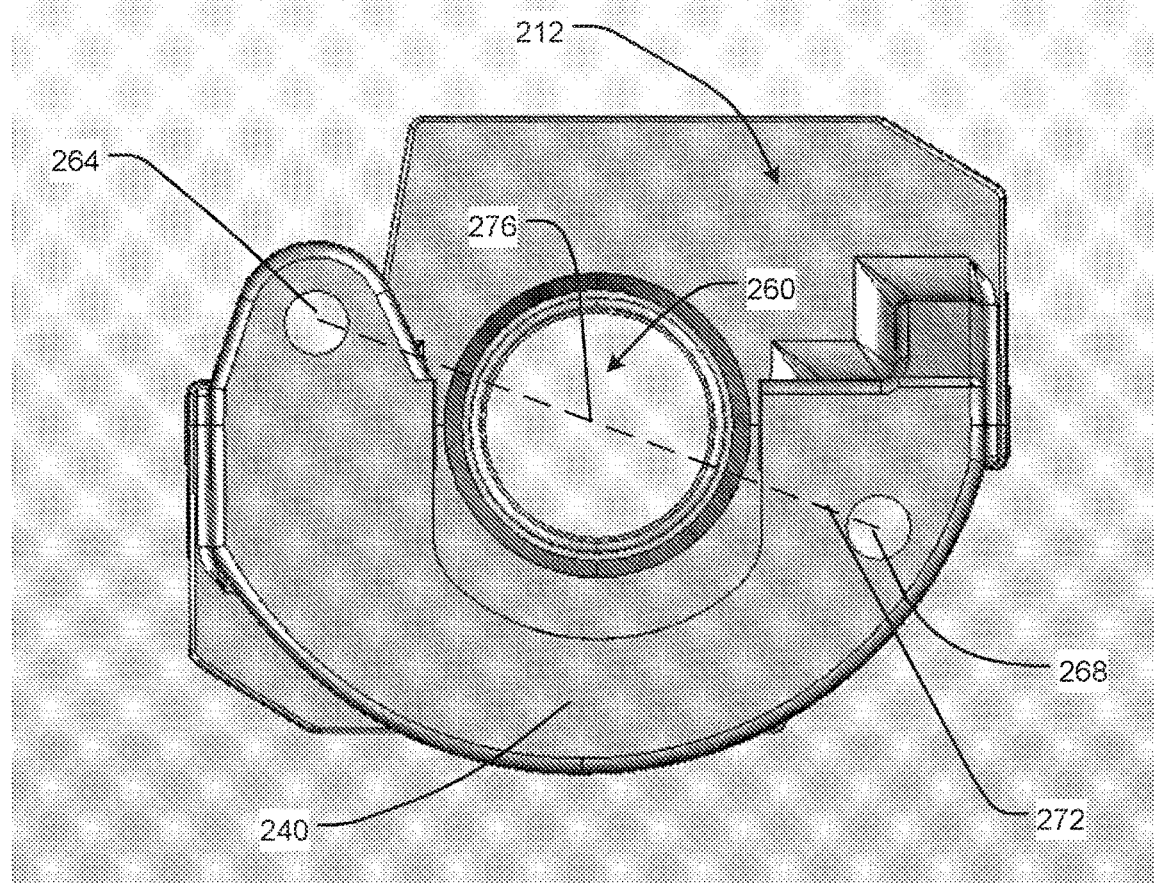
FIG. 4 is a top view of an example of a sprinkler.

FIGS. 2-4 depict a sprinkler 200. The sprinkler 200 can be used to implement the sprinkler 108 of FIG. 1. For example, the sprinkler 200 can be coupled with the one or more pipes 112. Various examples of the sprinkler 200 can be used for various modes of operation or installation, including but not limited to concealed sprinkler, upright sprinkler, and pendent sprinkler modes of operation or installation.

The sprinkler 200 can be a polymeric sprinkler. For example, the sprinkler 200, including portions thereof such as body 204, frame arms 232, 236, and connector member 240, can be manufactured using materials such as composite materials. The sprinkler 200 can be manufactured by injection molding the materials to form the sprinkler 200. The materials can include a resin, such as a thermoplastic polymeric resin. The materials can include reinforcing fibers. The materials can be made as a composite of a resin and reinforcing fibers. The sprinkler 200 or a portion thereof, such as frame arms 232, 236, can be made such that the reinforcing fibers are parallel to longitudinal axis 228 (or within a threshold angle of parallel, such as within five degrees, three degrees, or one degree parallel to longitudinal axis 228). This can facilitate providing the sprinkler 200 with rigidity in appropriate directions to mitigate stresses applied to the sprinkler 200 under fire conditions (or test conditions representative of fire conditions).

The composite material can include a thermoplastic polymeric resin and a plurality of reinforcing fibers. Examples of the composite material are described with respect to the following standards: ASTM International Standards D3418, D570, E831, D638, D695 and International Organization for Standardization (ISO) Standards 294-24 and 2577, all of which are incorporated by reference herein in relevant part.

In an example, the composite material can include a thermoplastic polymeric resin and a plurality of reinforcing fibers. The thermoplastic polymeric resin has a peak melting temperature of at least about 250° C. (as determined pursuant to ASTM D3418), a water absorption of no more than about 0.3 wt. % (as determined pursuant to ASTM D570), and a coefficient of thermal expansion of no more than about 100 microns/m (as determined pursuant to ASTM E831). The composite material may have an elongation at break of no more than about 3% (as determined pursuant to ASTM D638). The composite material may have a compressive strength of at least about 150 MPa (as determined pursuant to ASTM D695). The composite material may have a tensile strength of at least about 150 MPa (as determined pursuant to ASTM D638), and, in some instances, may have a tensile strength of at least about 200 or at least about 250 MPa. The composite material may have a transverse molding shrinkage of no more than about 1% (as determined pursuant to ISO 294-24, 2577). The composite material may have a melt flow index at 400° C. of at least about 1 g/10 min. The melt flow index may be at least about 10 g/10 min at 400° C. The thermoplastic polymeric resin may include polyphenylenesulfide, polyphthalamide, polyetheretherketone (PEEK), polyetherimide or a combination of two or more thereof. The reinforcing fibers may be glass fibers, carbon fibers, aramid fibers or a mixture of two or more thereof.

In an example, the composite material includes a thermoplastic polymeric resin and a plurality of reinforcing fibers. The thermoplastic polymeric resin has a melting point of at least about 250° C., water absorption of no more than about 0.3 wt. % (as determined pursuant to ASTM D570), and the composite material has an elongation at break of no more than about 3% (as determined pursuant to ASTM D638). The composite material may have a coefficient of thermal expansion of no more than about 100 microns/m (as determined pursuant to ASTM E831). The composite material may have a compressive strength of at least about 150 MPa (as determined pursuant to ASTM D695). The composite material may have a tensile strength of at least about 150 MPa (as determined pursuant to ASTM D638), and, in some instances, may have a tensile strength of at least about 200 or at least about 250 MPa. The composite material may have a transverse molding shrinkage of no more than about 1% (as determined pursuant to ISO 294-24, 2577). The composite material may have a melt flow index at 400° C. of at least about 1 g/10 min. The composite material may have a melt flow index of at least about 10 g/10 min at 400° C.

In an example, the composite material includes a thermoplastic polymeric resin and a plurality of reinforcing fibers. The thermoplastic polymeric resin has a melting point of at least about 250° C., water absorption of no more than about 0.3 wt. % (as determined pursuant to ASTM D570), and the composite material has a transverse molding shrinkage of no more than about 1% (as determined pursuant to ISO 294-24, 2577). The composite material may have an elongation at break of no more than about 3% (as determined pursuant to ASTM D638). The composite material may have a coefficient of thermal expansion of no more than about 100 microns/m (as determined pursuant to ASTM E831). The composite material may have a compressive strength of at least about 150 MPa (as determined pursuant to ASTM D695). The composite material may have a tensile strength of at least about 150 MPa (as determined pursuant to ASTM D638), and, in some instances, may have a tensile strength of at least about 200 or at least about 250 MPa. The composite material may have a transverse molding shrinkage of no more than about 1% (as determined pursuant to ISO 294-24, 2577). The composite material may have a melt flow index at 400° C. of at least about 1 g/10 min. The composite material may have a melt flow index of at least about 10 g/10 min at 400° C.

In an example, the composite material includes a thermoplastic polymeric resin and a plurality of reinforcing fibers. The thermoplastic polymeric resin has a melting point of at least about 250° C., a water absorption of no more than about 0.3 wt. % (as determined pursuant to ASTM D570, and the composite material has a tensile strength of at least about 150 MPa (as determined pursuant to ASTM D638). In some instances, the composite material may have a tensile strength of at least about 200 or at least about 250 MPa. The composite material may have a compressive strength of at least about 150 MPa (as determined pursuant to ASTM D695). The composite material may have a coefficient of thermal expansion of no more than about 100 microns/m (as determined pursuant to ASTM E831). The composite material may have an elongation at break of no more than about 3% (as determined pursuant to ASTM D638). The composite material may have a transverse molding shrinkage of no more than about 1% (as determined pursuant to ISO 294-24, 2577). The composite material may have a melt flow index at 400° C. of at least about 1 g/10 min. The composite material may have a melt flow index of at least about 10 g/10 min at 400° C.

In an example, the composite material includes a thermoplastic polymeric resin and a plurality of reinforcing fibers. The thermoplastic polymeric resin is selected from the group consisting of Polyphenylene Sulfide (PPS), Polyetheretherketone (PEEK), Polyetherketoneketone (PEKK), Polyphthalamide (PPA), Polyimide (TPI), Polyamide (PA), Polysulfone (PSU), Polyethersulfone (PES), Polyetherimide (PEI), Liquid Crystal Polymer (LCP) and mixtures of two or more thereof. The reinforcing fibers selected from the group consisting of glass fibers, carbon fibers, aramid fibers and mixtures of two or more thereof.

In an example, the thermoplastic polymeric resin is PPS and the reinforcing fibers is glass fibers and/or carbon fibers. The composite material includes about 25 to 45 wt. % glass fibers. The thermoplastic polymeric resin may have a peak melting temperature of at least about 250° C. (as determined pursuant to ASTM D3418), and a water absorption of no more than about 0.1 wt. % (as determined pursuant to ASTM D570). The composite material may have a coefficient of thermal expansion of no more than about 100 microns/m (as determined pursuant to ASTM E831). The composite material may have an elongation at break of no more than about 2% (as determined pursuant to ASTM D638). The composite material may have a compressive strength of at least about 150 MPa (as determined pursuant to ASTM D695). The composite material may have a tensile strength of at least about 150 MPa (as determined pursuant to ASTM D638). The composite material may have a transverse molding shrinkage of no more than about 0.8% (as determined pursuant to ISO 294-24, 2577). The composite material may have a melt flow index at 400° C. of at least about 1 g/10 min. The composite material may have a melt flow index of at least about 10 g/10 min at 400° C.

In an example, the thermoplastic polymeric resin is PEKK and the reinforcing fibers are glass and/or carbon fibers. The composite material includes about 25 to 35 wt. % glass fibers. The thermoplastic polymeric resin may have a peak melting temperature of at least about 325° C. (as determined pursuant to ASTM D3418), and a water absorption of no more than about 0.2 wt. % (as determined pursuant to ASTM D570). The composite material may have a coefficient of thermal expansion of no more than about 50 microns/m (as determined pursuant to ASTM E831). The composite material may have an elongation at break of no more than about 3% (as determined pursuant to ASTM D638). The composite material may have a compressive strength of at least about 150 MPa (as determined pursuant to ASTM D695). The composite material may have a tensile strength of at least about 150 MPa (as determined pursuant to ASTM D638), and, in some instances, may have a tensile strength of at least about 200 or at least about 250 MPa. The composite material may have a transverse molding shrinkage of no more than about 1.5% (as determined pursuant to ISO 294-24, 2577). The composite material may have a melt flow index at 400° C. of at least about 5 g/10 min. The composite material may have a melt flow index of at least about 10 g/10 min at 400° C.

In an example, the thermoplastic polymeric resin is PEI and the reinforcing fibers are glass and/or carbon fibers. The composite material may include about 25 to 35 wt. % carbon fibers. The thermoplastic polymeric resin may have a glass transition temperature of at least about 200° C. (as determined pursuant to ASTM D3418) and a water absorption of no more than about 0.2 wt. % (as determined pursuant to ASTM D570). The composite material may have a coefficient of thermal expansion of no more than about 25 microns/m (as determined pursuant to ASTM E831). The composite material may have an elongation at break of no more than about 1.3% (as determined pursuant to ASTM D638). The composite material may have a compressive strength of at least about 200 MPa (as determined pursuant to ASTM D695). The composite material may have a tensile strength of at least about 150 MPa (as determined pursuant to ASTM D638), and, in some instances, may have a tensile strength of at least about 200 or at least about 250 MPa. The composite material may have a transverse molding shrinkage of no more than about 0.2% (as determined pursuant to ISO 294-24, 2577). The composite material may have a melt flow index at 380° C. of at least about 25 g/10 min. Typically, the composite material may have a melt flow index of at least about 50 g/10 min at 380° C.

In an example, the thermoplastic polymeric resin is PPA and reinforcing fibers are glass and/or carbon fibers. The composite material may include about 20 to 35 wt. % glass fibers. The thermoplastic polymeric resin may have a peak melting temperature of at least about 300° C. (as determined pursuant to ASTM D3418) and a water absorption of no more than about 0.3 wt. % (as determined pursuant to ASTM D570). The composite material may have a coefficient of thermal expansion of no more than about 250 microns/m (as determined pursuant to ASTM E831). The composite material may have an elongation at break of no more than about 2.5% (as determined pursuant to ASTM D638). The composite material may have a compressive strength elongation at break of at least about 150 MPa (as determined pursuant to ASTM D696). The composite material may have a tensile strength of at least about 150 MPa (as determined pursuant to ASTM D638), and, in some instances, may have a tensile strength of at least about 200 or at least about 250 MPa. The composite material may have a transverse molding shrinkage of no more than about 1.2% (as determined pursuant to ISO 294-24, 2577). The composite material may have a melt flow index at 400° C. of at least about 1 g/10 min. the composite material may have a melt flow index of at least about 10 g/10 min at 400° C.

The sprinkler 200 can include a body 204. The body 204 can include a body wall 208 that extends from an inlet 212 to a surface 216. The inlet 212 can couple with a fluid source, such as one or more pipes 112. For example, the body wall 208 can define one or more threaded members 218 that connect with thread receiving members of the one or more pipes 112 or an adapter coupled with the one or more pipes 112 to connect the sprinkler 200 with the one or more pipes 112.

The surface 216 can define an orifice 220 on an opposite side of the body 204 from the inlet 212. The orifice 220 can receive one or more sealing elements, such as a sprinkler button (not shown) to seal the orifice 220 to prevent fluid flow out of the orifice (e.g., until a thermal element, such as a fluid-filled tube, that applies a load to the one or more sealing elements to hold the one or more sealing elements in place is actuated responsive to a fire condition). A diameter of the orifice 220 can be less than a diameter of the inlet 212.

The orifice 220 can include a tapered portion 222 shaped to receive a sprinkler button. The tapered portion 222 can decrease in diameter from the surface 216 towards the inlet 212. The tapered portion 222 can extend from the surface 216 to a surface 226. The surface 226 can form a flat portion (e.g., the surface 226 can lie in a plane perpendicular to longitudinal axis 228) as compared to the tapering or beveled structure of tapered portion 222. The surface 226 can extend inwards (e.g., towards longitudinal axis 228) from the tapered portion 222. The tapered portion 222 can be formed through the injection molding process used to manufacture the sprinkler 200, as compared to metal sprinklers that may need to form a tapered portion through a separate machining process from machining or casting the body of the sprinkler.

As depicted in FIGS. 2 and 4, the body 204 can include an internal passageway 224 that extends from the inlet 212 to the orifice 220 defined by the surface 216. Fluid can flow through the internal passageway 224 from the inlet 212 to the orifice 220, such as to be outputted through the orifice responsive to a fire condition.

The internal passageway 224 can define a longitudinal axis 228. The longitudinal axis 228 can be perpendicular to a plane of the surface 216. The longitudinal axis 228 can be within a threshold angle of perpendicular to the plane of the surface 216. The threshold angle can be less than five degrees. The threshold angle can be less than three degrees. The threshold angle can be less than one degree.

The sprinkler 200 can include a first frame arm 232 and a second frame arm 236 that extend from the surface 216. The first frame arm 232 and the second frame arm 236 can extend in a direction opposite from the inlet 212. The first frame arm 232 and the second frame arm 236 can extend in a direction that is parallel with the longitudinal axis 228. The first frame arm 232 and the second frame arm 236 can extend within a threshold angle of parallel with the longitudinal axis 228. The threshold angle can be less than five degrees. The threshold angle can be less than three degrees. The threshold angle can be less than one degree.

The sprinkler 200 can include a connector member 240 that connects the first frame arm 232 with the second frame arm 236. The connector member 240 can provide torsional rigidity to the sprinkler 200, such as to provide rigidity for forces that torque the frame arms 232, 236 relative to one another. The connector member 240 can mitigate cooling effects that might otherwise reduce the effectiveness of the sprinkler 200.

The connector member 240 can include a first end 244 that extends from the first frame arm 232, a second end 248 that extends from the second frame arm 236, and a connector body 252 that extends between the first end 244 and the second end 248. The connector member 240 can form a curved structure.

The connector member 240 (e.g., the connector body 252) can extend parallel with the surface 216 and spaced from the surface 216. The connector member 240 can extend within a threshold angle of parallel with the surface 216 and spaced from the surface 216. The threshold angle can be less than five degrees. The threshold angle can be less than three degrees. The threshold angle can be less than one degree.

As depicted in FIGS. 2-4, the connector member 240 can include a sidewall 304 that defines an opening 260. The sidewall 304 can be curved. The sidewall 304 can extend at least partially around the longitudinal axis 228 and be spaced from the longitudinal axis to define the opening 260. For example, the connector member 240 can define the opening 260 to be a partially annular opening through which the longitudinal axis 228 passes. An arc length of the sidewall 304 around the longitudinal axis can be greater than sixty degrees and less than three hundred degrees. The arc length can be greater than ninety degrees and less than two hundred seventy degrees. The arc length can be greater than one hundred twenty degrees and less than two hundred ten degrees. The arc length can be one hundred eighty degrees.

The connector member 240 can include a first guide pin channel 264 adjacent to the first frame arm 232, and a second guide pin channel 268 adjacent to the second frame arm 236. The guide pin channels 264, 268 can receive guide pins (not shown) that help orient a deflector of the sprinkler 200 that causes fluid to be outputted from the sprinkler 200 in a target spray pattern. The guide pin channels 264, 268 can be useful for receiving the guide pins so that the guide pins can properly orient the deflector, resist pressure forces that occur responsive to activation of the sprinkler 200, and shape the flow of water from the orifice 220.

As depicted in FIGS. 2 and 4, the guide pin channels 264, 268 can define a channel axis 272 that intersects the longitudinal axis 228. The channel axis 272 can extend from centerlines of the guide pin channels 264, 268. The channel axis 272 can intersect the longitudinal axis 228 at a midpoint 276 of the channel axis 272 (or within a threshold distance of the midpoint 276, the threshold distance being on the order of a few thousands of an inch, such as being less than 0.01 inches). As such, the orifice 220 can be centered relative to the guide pin channels 264, 268, which can ensure that a minimum density of water per unit area is distributed over the coverage area when the sprinkler 200 is actuated (e.g., distributed via the deflector oriented by guide pins in the guide pin channels 264, 268). The length of the guide pin channels 264, 268 can correspond to a wall thickness of the connector member 240.

The first frame arm 232 can include an outward portion 280 and an inward portion 284 that is inward of the outward portion 280 relative to the longitudinal axis 228. The outward portion 280 of the first frame arm 232 can be formed on a side of the sprinkler 200 towards which the connector member 240 curves (e.g., relative to a plane bisecting the sprinkler 200 through the first frame arm 232, second frame arm 236, and longitudinal axis 228). As depicted in FIG. 3, the second frame arm 236 can include an outward portion 308 and an inward portion 312 that is inward of the outward portion 308 relative to the longitudinal axis, and the inward portion 312 can be formed on a side of the sprinkler 200 away from which the connector member 240 curves (e.g., relative to the plane bisecting the sprinkler 200 through the first frame arm 232, second frame arm 236, and longitudinal axis 228).

Figure 5:
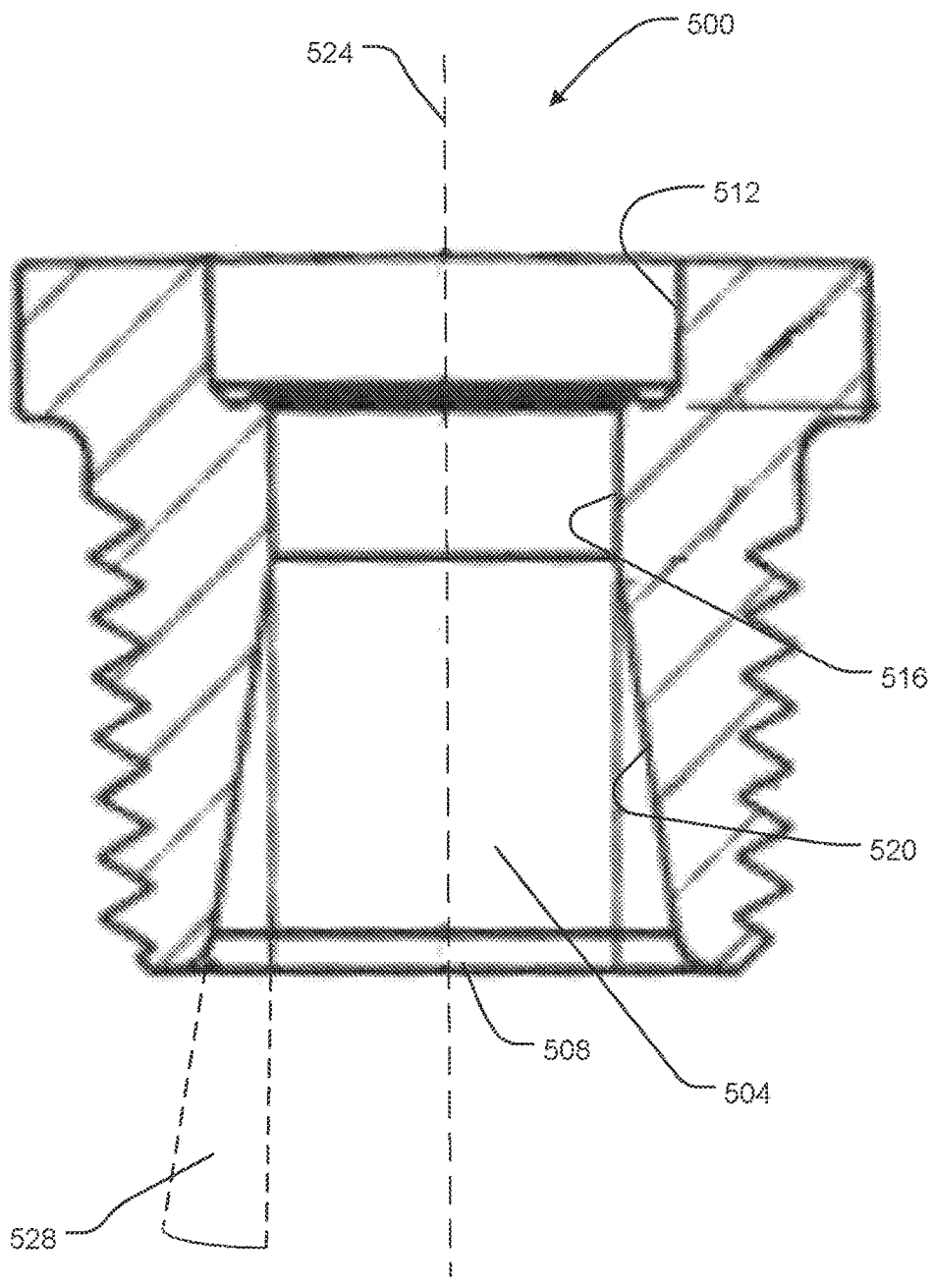
FIG. 5 is a section view of an example of a sprinkler body.

FIG. 5 depicts a body 500 of a sprinkler. The body 500 or features thereof can be used to implement the body 204 described with reference to FIGS. 2-4. The body 500 includes an internal passageway 504 that extends from an inlet 508 to an orifice 512 (e.g., the orifice 512 being at an outlet side of the internal passageway 504 relative to the inlet 508).

The internal passageway 504 can include a first portion 516 and a second portion 520 between the orifice 512 and the inlet 508. The first portion 516 can be between the orifice 512 and the second portion 520. The orifice 512 can have a greater diameter than the first portion 516.

The second portion 520 can increase in diameter from the first portion 516 towards the inlet 508 relative to a longitudinal axis 524 of the internal passageway 504. For example, the second portion 520 can define an angle 528 by which the diameter increases from the first portion 516 towards the inlet 508. The angle 528 can be greater than or equal to 0.5 degrees and less than or equal to 16 degrees. The angle 528 can be greater than or equal to 2 degrees and less than or equal to 10 degrees. The angle 528 of the second portion 520 can be used to

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel, or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A sprinkler, comprising:
a body comprising an internal passageway extending from an inlet to an orifice, the internal passageway defining a longitudinal axis;
a first frame arm extending from the body;
a second frame arm extending from the body, the first frame arm and the second frame arm each parallel with the longitudinal axis and comprising reinforcing fibers that are aligned within five degrees of parallel with the longitudinal axis; and
a connector member that is monolithic with the first frame arm and the second frame arm, the connector member includes a first end that extends from the first frame arm, a second end that extends from the second frame arm, a sidewall that extends between the first end and the second end, a first guide pin channel that extends into the body towards the inlet, and a second guide pin channel that extends into the body towards the inlet, an arc length of the sidewall around the longitudinal axis is greater than sixty degrees and less than three hundred degrees.

2. The sprinkler of claim 1, comprising:
the first frame arm comprises the first guide pin channel and the second frame arm comprises the second guide pin channel.

3. The sprinkler of claim 1, comprising:
the connector member defines a partially annular opening through which the longitudinal axis extends such that a line from the connector member through the partially annular opening and the longitudinal axis passes out through a gap between the first end and the second end.

4. The sprinkler of claim 1, comprising:
the orifice comprises a tapered portion that increases in diameter in a direction from the inlet towards a surface of the body that defines the orifice.

5. The sprinkler of claim 1, comprising:
the longitudinal axis intersects a line defined from the first guide pin channel to the second guide pin channel within a threshold distance of a midpoint of the line, the threshold distance less than 0.01 inches.

6. The sprinkler of claim 1, comprising:
the first frame arm includes a first outward portion outward from a first inward portion, the first outward portion on a side of the body towards which the connector member curves away from the longitudinal axis; and
the second frame arm includes a second outward portion outward from a second inward portion, the second outward portion on a side of the body away from which the connector member curves away from the longitudinal axis.

7. The sprinkler of claim 1, comprising:
the body is made of a composite material monolithically formed with the first frame arm and the second frame arm by injection molding, the composite material comprises thermoplastic polymeric resin and corresponding reinforcing fibers; and the thermoplastic polymeric resin has a peak melting temperature of at least about 250° C.; a water absorption of no more than about 0.3 wt. %; and the composite material has a coefficient of thermal expansion of no more than about 100 microns/m.

8. The sprinkler of claim 7, comprising:

the thermoplastic polymeric resin comprises polyphenylenesulfide, polyphthalamide, polyetheretherketone (PEEK), polyetherimide or a combination of two or more thereof; and the reinforcing fibers comprise glass fibers, carbon fibers, aramid fibers or a mixture of two or more thereof.

9. The sprinkler of claim 7, comprising:

the composite material has an elongation at break of no more than about 3%.

10. The sprinkler of claim 7, comprising:

the composite material has a tensile strength of at least about 150 MPa.

11. The sprinkler of claim 7, comprising:

the composite material has a transverse molding shrinkage of no more than about 1%.

12. The sprinkler of claim 7, comprising:

the composite material has a melt flow index at 400° C. of at least about 1 g/10 min.

13. The sprinkler of claim 7, comprising:

the composite material comprises:

(a) thermoplastic polymeric resin selected from the group consisting of Polyphenylene Sulfide (PPS), Polyetheretherketone (PEEK), Polyetherketoneketone (PEKK), Polyphthalamide (PPA), Polyimide (TPI), Polyamide (PA), Polysulfone (PSU), Polyethersulfone (PES), Polyetherimide (PEI), Liquid Crystal Polymer (LCP) and mixtures of two or more thereof; and (b) reinforcing fibers selected from the group consisting of glass fibers, carbon fibers, aramid fibers and mixtures of two or more thereof.

14. The sprinkler of claim 13, comprising:

the composite material comprises about 25 to 45 wt. % glass fibers and/or carbon fibers; and the thermoplastic polymeric resin comprises polyphenylenesulfide.

15. The sprinkler of claim 13, comprising:

the composite material comprises about 25 to 35 wt. % glass fibers and/or carbon fibers; and the thermoplastic polymeric resin comprises polyetherketoneketone.

16. The sprinkler of claim 13, comprising:

the composite material comprises about 25 to 35 wt. % glass fibers and/or carbon fibers; and the thermoplastic polymeric resin comprises polyetherimide.

17. The sprinkler of claim 13, comprising:

the composite material comprises about 20 to 35 wt. % glass fibers and/or carbon fibers; and the thermoplastic polymeric resin comprises polyphthalamide.

18. A sprinkler system, comprising:

one or more pipes that receive fluid from a fluid supply;

a body comprising an internal passageway extending from an inlet coupled with the one or more pipes to an orifice, the internal passageway defining a longitudinal axis, the body is made of a composite material;

a first frame arm monolithically formed with the body;

a second frame arm monolithically formed with the body;

a connector member connecting the first frame arm with the second frame arm, the connector member comprises a sidewall having an arc length around the longitudinal axis greater than sixty degrees and less than three hundred degrees;

a first guide pin channel defined into the connector member towards the inlet; and a second guide pin channel defined into the connector member towards the inlet.

19. The sprinkler system of claim 18, comprising:

the longitudinal axis intersects a line defined from the first guide pin channel to the second guide pin channel within a threshold distance of a midpoint of the line.

* * * * *